May 25, 1971  A. VERGARA OCHOA  3,580,772
METHOD AND APPARATUS FOR THE TRANSFER OF IMAGES ONTO
SURFACES OF HOLLOW ELASTOMERIC ARTICLES
Filed May 16, 1967  2 Sheets-Sheet 1
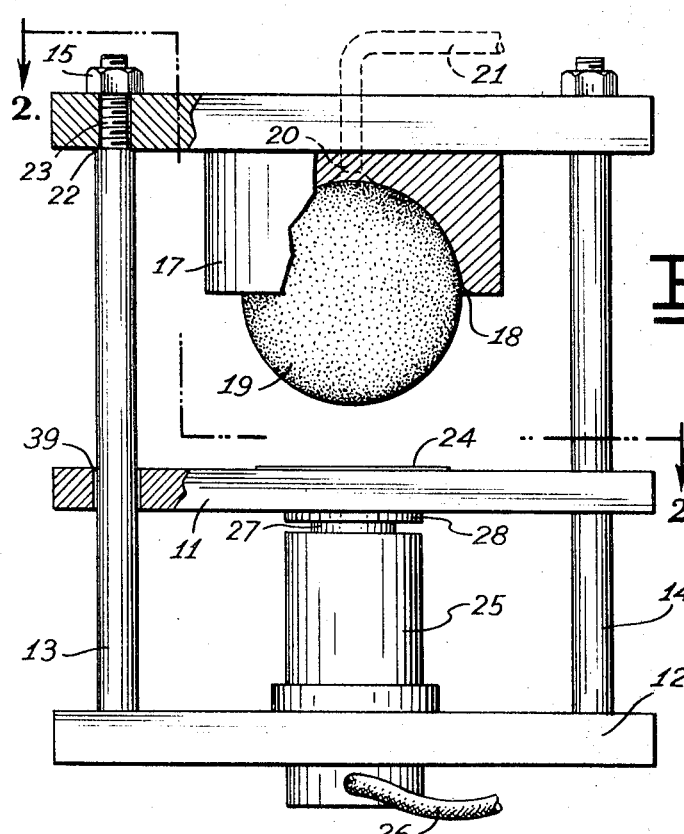
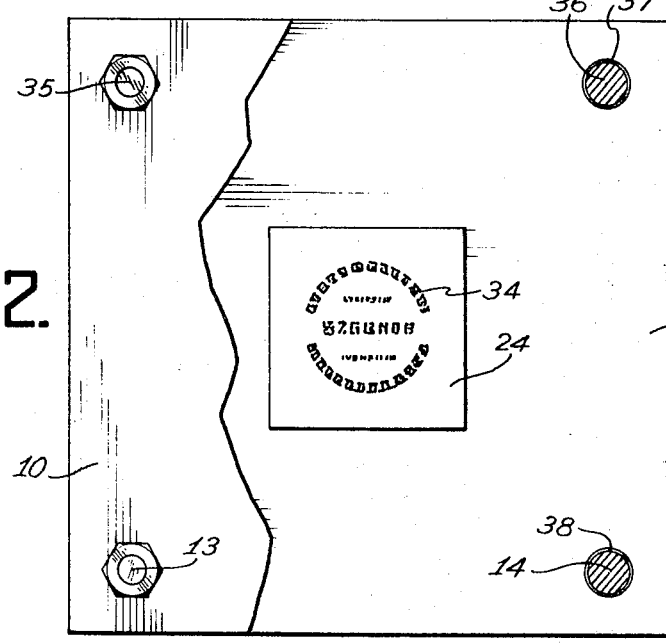
INVENTOR
ALFONSO VERGARA OCHOA

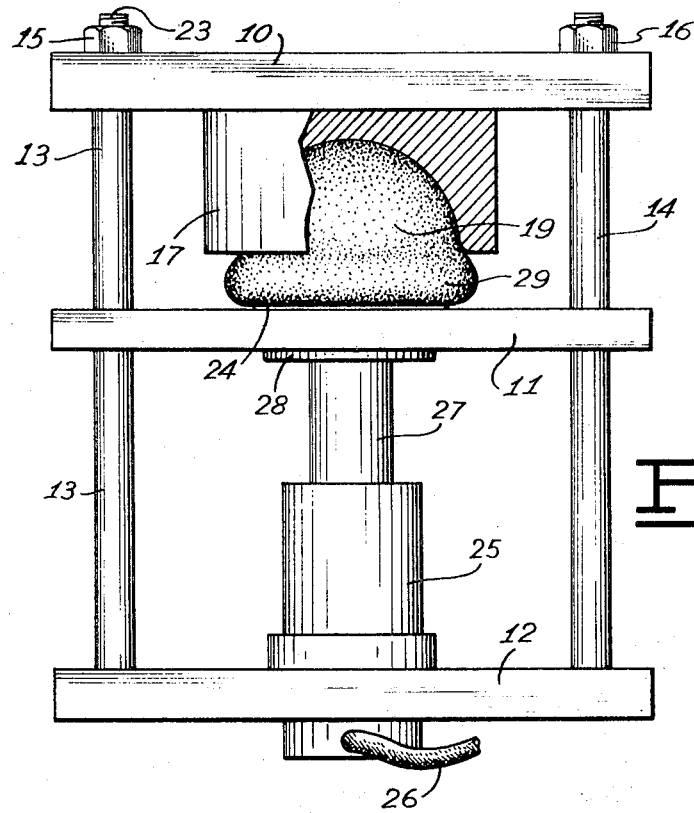
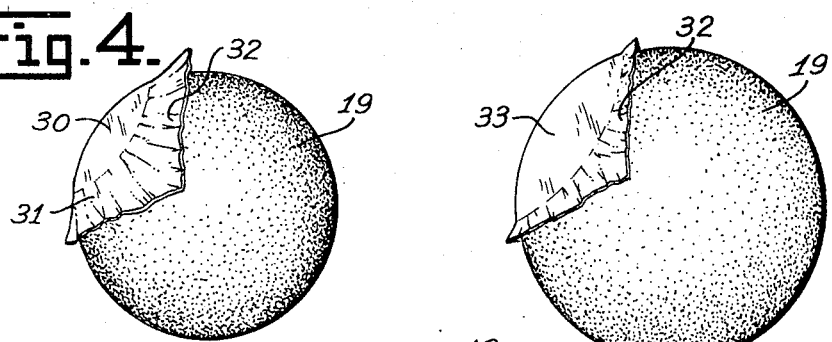
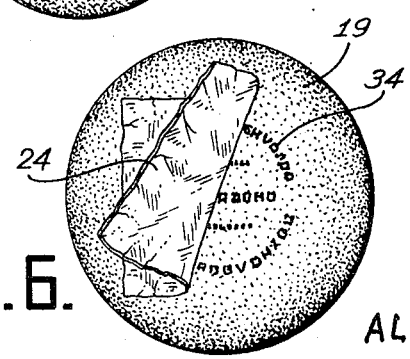

3,580,772
METHOD AND APPARATUS FOR THE TRANSFER OF IMAGES ONTO SURFACES OF HOLLOW ELASTOMERIC ARTICLES
Alfonso Vergara Ochoa, Tepeyac 1287, Guadalajara, Jalisco, Mexico
Filed May 16, 1967, Ser. No. 638,964
Claims priority, application Mexico, Feb. 6, 1967, 93,867
Int. Cl. B44c 5/00
U.S. Cl. 156—240            10 Claims

ABSTRACT OF THE DISCLOSURE

A process for the transfer of images from a flat film onto the surface of moderately irregular hollow elastomeric articles, which comprises printing a film with an ink having a resin base incompatible with the resin of said film, applying a layer of a resin varnish on the surface of said printed film or on the surface of the article, said varnish having a resin base compatible with the base of said ink and with the resin of which said article has been formed, applying said film on the surface of said elastomeric article, inflating the article in order to extend and tighten the film on its surface, while the varnish is still on its mordant state, allowing the varnish to dry, and peeling off the film from the surface of said article whereby the printed image will be transferred unto the surface of said article.

An apparatus for carrying out the above described process which comprises a hydraulic press with a flat movable lower platen to accommodate a printed film and a concave fixed upper platen with means for supporting an irregular hollow article, and means for displacing said lower platen to contact said film with the article supported by the upper platen whereby the film will be adhered thereto.

---

The present invention refers to the transfer of all types of images to articles manufactured of elastomeric materials and, more particularly, it is related with a novel method and apparatus for the transfer of printings, drawings, designs and other types of images, onto the surface of articles manufactured from plastic materials, such as balls, dolls or any other articles of moderately irregular surface.

It is well known that heretofore, in articles manufactured from elastomeric materials, such as balls and the like, it has been customary to effect the printing operation by means of very complicated machines, or otherwise manually, but in general this ornamentation is effected by spraying the coloring material such as paint or ink, using an air gun, unto the surfaces of the articles, and by the utilization of proper masks to produce the desired design on the surface of each article. Said masks must be manufactured from sufficiently resistant materials such as metal sheet, and must assume the moderately irregular forms of the articles which are to be ornamented in order to provide for the concealing of certain portions of the surface of the articles and the exposure of others on which the paint or other coloring material is to be deposited for ornamental purposes or any other purposes implying the transfer of an image unto the surface of an article of this character.

Of course, all the processes and systems priorly used for this purpose are not quite suitable, inasmuch as the operation is very cumbersome, slow and uneconomical, and a sufficiently high quality of the transferred image is not achieved, since the masks tend to inadvertently move, either accidentally or by carelessness of the workers, so that the different colors which are applied on the surfaces of the article can be unduly overlapped or smeared, thus giving a bad appearance to the thus produced articles.

Having in mind the defects of the prior art transfer operations, it is an object of the present invention to provide a novel method for the transfer of images onto the surfaces of any article having a moderately irregular shape, which will not require utilization of masks and which will be of very simple and economical execution.

It is another object of the present invention to provide an improved method for the transfer of images onto the surfaces of a moderately irregular article, such as a ball, by which the transfer of an image printed on a flat surface is effected therefrom to the non-flat surface of an article to be ornamented.

It is a more particular object of the present invention to provide a method of the above mentioned character, in which the printings are effected without the risk of overlapping between the different colors, or of smears of the coloring material, and all this without the need of using complicated tools or machines.

Another object of the present invention is to provide an apparatus for carrying out the method of the present invention, which will render the transfer operation very simple and economic.

A still further object of the inventions to provide an apparatus of the above mentioned character, which will provide for the flattening of a predetermined area of the article which corresponds to that on which a film for the transfer of an image will be contacted therewith.

Another object of the present invention is to provide a process for the transfer of images onto the surface of inflatable hollow articles, which will avoid the wrinkling of the transfer film at the outer zones after the film has been applied onto the surfaces of the article.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a side elevational view, partly broken away to show inner details, of an apparatus highly suitable for carrying out the step of applying a film for the transfer of images, onto the surface of a hollow elastomeric article;

FIG. 2 is a plan cross sectional view taken along lines 2—2 of FIG. 1 and looking in the direction of the arrows;

FIG. 3 is an elevational view of the apparatus shown in FIG. 1, in its film applying or closed position;

FIG. 4 is a perspective view of the article with the film adhered thereto and with the article in its uninflated condition;

FIG. 5 is a perspective view of the article and film shown in FIG. 4, with said article in its inflated condition to adhere a greater area of said film; and FIG. 6 is a perspective view of the already ornamented article, with the film in condition to be peeled off from the article.

While the method of the present invention for the transfer of images onto the surfaces of irregular articles is highly useful for the transfer of such images to any article having a flat or non-flat surface, the present invention will be described in the following paragraphs in terms of a particularly preferred embodiment thereof, that is, in terms of the application of a design, drawing or legend onto the surface of a ball. It is to be understood, however, that the invention must not be limited to the above mentioned particular application, but that it is liable to be used with any other type of article, either with a flat surface, or with a moderately irregular nonflat surface.

Broadly speaking, the process for the transfer of images in accordance with the present invention comprises effecting the printing of the image which is to be transferred, on a film of plastic material, said printing operation being carried out by means of an ink made with a resin which is incompatible with the resin of which the above mentioned film is formed, but which will be adhered thereto in a removable manner. Thereafter, the film printed with this incompatible ink, is applied by any manual or mechanical means, on the surface of the article upon which the image is to be transferred; the surface of the article or the transfer area of the film being previously covered with a varnish made of a resin which can be the same as that used in the printing ink, or any other compatible resin, thereafter leaving the varnish to reach its mordant point, that is, the point at which it is beginning to gel, but at which it exerts its maximum adherent power with respect to the resin of which the ink is formed, so that, in this manner, the image initially printed on the film, by presenting a higher adherence in front of the varnish applied, will remain adhered to said varnish, thereby being removed from the film which is thereafter peeled out of the surface, leaving the image transferred thereon. Of course that the article on which surface the image is to be transferred, must also be made of a material which is compatible with the varnish applied either on said article or on the transfer area of said film, so that said varnish will be suitably adhered on the surface of said article, thereby adhering the image applied contiguous to the varnish, to the surface of the article, which article will remain duly ornamented thereby.

In accordance with a particularly preferred embodiment of the invention, it is preferred that the article to be printed or ornamented be manufactured from vinyl resins, for instance, vinyl chloride homopolymers or copolymers, such as vinyl chloride and vinyl acetate copolymers, and the like, in view of the fact that this type of material is the most broadly used for the manufacture of thermoplastic articles such as balls, dolls, coatings for several surfaces, and the like.

Based upon the above, it is preferred that the varnish which is to be applied onto the surface of the article, or on the transfer area of the printed film, is manufactured by the dissolution of a vinyl resin in a solvent, which must have a slow vaporization rate to provide for a period sufficient to enable the ink and the article to be adhered thereon prior to drying, that is, which will have a mordant point sufficiently low, so as to provide for a period of time to effect the operations by means of which the printed film is applied on the surface of the vinyl article.

The film on which the image is initially printed, is preferably manufactured from a resin which is incompatible with the vinyl resins, such as polyethylene, polypropylene, polystyrene and other like resins, and with the ink with which the image is applied on this film, preferably are inks having a vinyl resin base, or a base made of any other resin compatible with the latter, and containing a suitable added pigment, and a solvent to form a printing paste which will thereafter be applied, by means of a reciprocal or rotative printing machine, onto the said film.

In this manner, the image is left printed on the film made of polyethylene or any other similar material, even when its adherence is not very high. As the adherence of the ink thus applied on the film is higher in front of the vinyl resin varnish, when said varnish is applied and firmly adhered on the surface of the vinyl article, when the film is applied, and when pressing on the mordant surface of the priorly applied varnish, the image will be removed from the film and will be adhered to said varnish, so that the film can be thereafter peeled out from the article, thereby leaving the printing perfectly transferred thereon, without overlapping defects or smearing or other like problems which were continuously present in the operations of transferring images which were used conventionally for this type of article. On the other hand, when in accordance with a second embodiment of the invention, the mordant varnish is applied on a printed film manufactured with polyethylene or the like, this operation can be effected, for instance, by means of any of several well known processes, such as the so called "process" method or the like, which will render this operation much easier than the application of the varnish to the hollow article. The layer of varnish applied on the previously printed film, when in the mordant state, will loosen the ink removable adhered to the polyethylene resin of the film and, when this film is applied on the hollow article and said article is pressed against the mordant surface of the varnish, the image will be removed from the film and the latter can be peeled off when the varnish is dry, so as to produce an ornamented hollow article.

In order to carry out the process of this invention in accordance with anyone of the above described embodiments thereof, it is preferred to subject the hollow article, when the latter is inflatable, to an inflation step after the film has been applied thereon, in such a way that the size of said article will increase in about from 10 to 20%, preferably 15%, whereby it has been surprisingly found that a higher adhesion between the article and the film is achieved, and the wrinkles which normally appear at the outer areas of the transfer film are completely removed.

While the process of the present invention can be effected in a reasonably efficient manner without the use of special apparatusses, it is preferred in accordance with the present invention, in order to achieve a higher efficiency, to carry out said process by the use of the apparatus illustrated in the accompanying drawings.

Having now more particular reference to the drawings, there is shown an apparatus for carrying out the step of applying the printed film on the hollow article, said apparatus comprising a hydraulic or pneumatic press which comprises a fixed platen 10 and a movable platen 11, supported on a base 12 by means of a plurality of vertical rods 13, 14, 35 and 36 comprising threaded upper ends 23 to receive fastening nuts such as those illustrated by the reference characters 15 and 16. The fixed platen 10 seats on shoulders 22 provided at the upper ends of each one of the above mentioned rods to be supported in position thereby.

The movable platen 11 is provided with a plurality of openings such as those illustrated in 37, 38 and 39 in FIGS. 1 and 2, which have a suitable diameter to provide for the sliding of said platen up and down along the rods 13, 14, 35 and 36 in accordance with the needs of the operation. The fixed platen 10 is provided with a supporting element 17 having an outer cylindrical form and a cavity 18 of suitable shape to accommodate and support a hollow article 19 in position. The hollow article, in accordance with the preferred embodiment of the invention is a spherical ball supported by a semispherical cavity 18 to which a suitable size is given such that the article 19 can be supported by friction, when the latter is forcibly introduced so as to exert pressure on the walls of the cavity. If desired, cavity 18 can be connected to a nozzle 20 which in turn is connected with a pipe 21 for applying vacuum to support article 19 in its position and for applying pressure when it is desired to eject said article 19 from cavity 18. However, this vacuum and pressure accessories are not necessary, as mentioned above.

The movable platen 11 is pressed by means of a hydraulic or pneumatic cylinder 25 fed with fluid through a pipe 26, said cylinder being provided with a plunger 27 which, by means of the flat member 28 is suitably fastened to the undersurface of platen 11 so that the latter can be moved up and down between the positions indicated in FIGS. 1 and 2 of the drawings.

For carrying out the preferred embodiment of the process in accordance with the present invention, a film of a plastic material incompatible with a vinyl resin base ink is printed therewith, and then a layer of a varnish compatible with the ink and incompatible with the film, is applied on said printed film, for instance, by means of the so called "process" method. The varnish is allowed to stand aside for about 1 to 2 minutes while the film or a label cut therefrom is transported on a cronized table so as to pick up the film with the varnish in its mordant state. The label 24 is deposited on the movable platen 11 of the above described press.

At the same time, the article 19 to be printed is supported by the support member 17 within its cavity 18, said article 19 being in a partially inflated condition so as to give it a suitable degree of flexibility. The platen 11 is moved to the position indicated in FIG. 2, whereby the label 24 is contacted with article 19 and the latter is flattened in order to form a flat zone 29 which will span all the area covered by the film 24. Thereafter, the press is opened and, if necessary, the position of the article is reversed to receive another label, when this is desirable.

The article 19 is removed from the press in the form illustrated in FIG. 4, with the label 24 firmly adhered in the zone 30, and with a surrounding zone 31 partially adhered to the article but containing wrinklings which, if kept unchanged until the varnish is dried, will give a defective appearance to the printed image. Finally, the film shows a peripheral zone 32 completely removed from article 19. Before the varnish loses its mordant characteristics, article 19 is inflated in order to increase its size in an amount of from 10 to 20%, preferably 15%, whereby a zone 33 is produced which is perfectly adhered and is equivalent to the original zones 30 and 31 above described. This inflation operation must be effected before the varnish is dried out, in order that the label will be suitably tightened and fastened to the article 19 on all the printed areas without showing any wrinkle which can be able to produce defects thereon.

After the article has been inflated, it is allowed to stand for about 2 minutes so as to dry the varnish, and the label 24 is peeled off the article 19, whereby the image 34 remains firmly and unremovably adhered to article 19 as shown in FIG. 6.

A highly suitable varnish to be used in this type of method comprises a vinyl chloride vinyl acetate copolymer resin, dissolved in a suitable organic solvent, such as methylethyl ketone, methylisobutyl ketone, and mixtures thereof. A highly suitable ink is a rotogravure ink prepared with a base of vinyl chloride-vinyl acetate copolymer resin of similar nature as the resin with which the varnish composition has been prepared.

The invention will be more fully illustrated in the following examples, which are to be construed as illustrative but not as limitative of the invention.

EXAMPLE 1

A thin layer of a varnish prepared by dissolving a suitable amount of vinyl chloride and vinyl acetate copolymer resin, in a mixture of methyl isobutylketone and toluene as a solvent, was applied on a ball prepared with the same copolymer, on a zone of its surface, by means of a brush.

On the other hand, a polyethylene film was printed, in a rotative printing machine, with a black ink prepared by homogeneously admixing a polyvinyl chloride resin, carbon black and toluene in an amount just sufficient to form a printing paste. The printing film was dried and formed into rolls for its further utilization.

From the roll of printed film thus formed, a portion in the form of a square was cut, containing at the center thereof the image to be transferred, and said square was fastened, around the image, by means of a circular tenter-frame, maintaining the printed polyethylene film tightly stretched.

The film and tenter-frame unit was applied in a tight manner on a portion of the spherical surface of a ball made of polyvinyl chloride-polyvinyl acetate copolymer resin, pressing the tenter-frame in order to achieve a perfect and homogeneous contact on all the printing area. Then the film was wiped on the non-printed face, by means of a spheric roller, taking care of wiping all portions of the transfer area.

The tenter-frame was then removed from the film, which was by then partially adhered to the ball. Then a corner of said film was pulled, peeling it out from the surface of the ball, and leaving the whole image without any distortion, perfectly transferred on the surface of the ball.

Other printing inks were prepared by the addition of blue, green, orange and other colored pigments, with similar results.

EXAMPLE 2

An image was printed on a polyethylene film, by the use of inks comprising a VMCH resin (vinyl chloride and vinyl acetate copolymer manufactured by Union Carbide) so as to obtain a rotogravure ink. Thereafter, there was applied on the printed film, covering all the image areas, a thin layer of a varnish prepared by dissolving a suitable amount of VMCH resin in a mixture of methylethyl ketone and methylisobutyl ketone, by means of the so-called "process" method.

A label was cut from the above mentioned film and was placed, while the varnish was in its mordant state, after 1.5 minutes, on the movable platen 11 of the above described apparatus. At the same time, a partially inflated pneumatic ball was supported on the support of the fixed platen 10 of said apparatus. The press was closed so as to flatten the ball and press it against the label, and said press was again opened.

The ball was removed from the support and was inflated so as to increase its size by 15%, whereby the adhered label was extended and tightened and the exant wrinkles removed.

The assembly was allowed to stand for about 2 minutes and the label was peeled off from the ball, whereby the image remained faithfully transferred on the latter.

As it can be seen from the above, there is provided a novel method for the transfer of images from a thermoplastic material film onto an article having a flat or non-flat moderately irregular surface, said process being highly economical, simple to carry out, and does not show any of the disadvantages shown by all processes of the prior art, especially in the field of the manufacture of balls, wherein the images had to be directly applied on the surface of the ball, without having to resort to any transfer method which might facilitate the operation.

The novel process for the transfer of images from a printed film to the surface of an elastomeric article, in accordance with the present invention, is highly useful when it is intended to transfer an image to articles with a somewhat irregular surface, such as having irregularities caused by an embossment or a design of the sand-grain type, or by small protuberances and grooves on the surface of the article, since by the wiping of the film adhered on said article, the film is electrostatically charged, together with the ink covering it, with an electric charge which is contrary to that charging the ornamented article, whereby the ink is thrown into the grooves of the embossment, thereby providing for the obtention of a perfectly uniform image which is printed also within those interstices which otherwise would have been inaccessible to any type of wiper.

The above, as well as other advantages described for the process of the present invention, render the latter highly versatile, and capable of being applied on articles which, in accordance with the prior art, had to be ornamented by the costly spraying of paints or inks by an air gun, for instance, in order to force such paints or inks to enter within the interstices of the embossed articles which were inaccessible to any type of transfer material.

While in the above, reference has been made to the application of a vinyl-type ink onto the surface of a hydrocarbon resin film which is incompatible with vinyl resins, and to the application, on the other hand, of a vinyl-type varnish, either to the surface of an article made with a vinyl resin compatible with said varnish, or to the image areas of the printed film, it must be understood that the above does not restrict the invention, inasmuch as its principles of operation reside in the fact of applying, to a resin film, an ink incompatible with the resin of said film, and of applying, either to the article to be ornamented or to the printed film, a varnish compatible with said article and also with the above mentioned ink, to thereafter contact both article and film and finishing the transfer operation by the removal of the film from the article to be ornamented.

On the other hand, while in order to carry out the process of the invention it is preferred to use the apparatus described in the specification and illustrated in the drawings, this is not indispensible and any other means for contacting the film and the article can be used, provided that the film will not show any wrinkles on the transfer area so as to avoid any defect in the finished article.

Although in the above certain specific embodiments of the invention have been shown and described, it is to be understood that many modifications thereof are possible. The invention, therefore, is not to be restricted except insofar as is necessitated by the prior art and by the spirit of the appended claims.

That which is claimed as new, is:

1. Method of transferring an image from a flat hydrocarbon resin plastic film onto the surface of an elastomeric material comprising a vinyl resin, which comprises the steps of:
   (a) applying to a surface of the hydrocarbon resin film an image including at least one ink having a vinyl resin base which is incompatible with the hydrocarbon resin but compatible with the vinyl resin of which the elastomeric material is composed; said ink image being removably adhered to said hydrocarbon resin film;
   (b) applying to the surface of said elastomeric material a layer of a varnish comprising a solution of a vinyl resin compatible with the vinyl resin of said elastomeric material and allowing said varnish to dry until it has attained maximum adherent power with respect to the resin forming said ink;
   (c) contacting said image on said plastic film with the elastomeric article surface under moderate pressure for a period of time sufficient to permit transfer of said image to the varnished surface of the elastomeric article;
   (d) extending the plastic film over the elastomeric article while said varnish maintains its highest adherence point in order to effect a smooth transfer of the image from the film to the receiving article; and
   (e) allowing said varnish layer to dry whereby the plastic film can be stripped away leaving the image on the receiving article.

2. The method of claim 1 in which said varnish is applied to the image-bearing area of said plastic film.

3. The method of claim 1 in which said hydrocarbon resin is selected from the group consisting of polyethylene, polypropylene, and polystyrene.

4. The method of claim 1 in which said varnish comprises a solution of a copolymer of vinyl chloride and vinyl acetate in an organic solvent.

5. The method of claim 1 in which said ink is a solution of a vinyl resin containing a pigment.

6. The method of claim 1 in which the image-bearing film is contacted in step (c) with a partially inflated hollow deformable elastomeric article, said article being pressed against the film in order to flatten an area thereof which will correspond at least to the transfer area of the film.

7. The method of claim 6 in which the film is extended over the elastomeric article by further inflating the latter to increase its size.

8. The method of claim 6 in which the film is extended over the elastomeric article by further inflating the latter to an extent such that the area of the article which will correspond to the transfer area of the film will increase in size to about from 10% to 20% of the partially inflated size.

9. The method of claim 1 in which said varnish is allowed to stand for a period of from 1 to 2 minutes in order to attain said highly adherent condition.

10. The method of claim 1 in which said elastomeric article has a non-smooth surface and in which the face of said plastic film which is not contacted with said article is wiped to stretch said film thereby producing an electrostatic charge to improve the transfer of the ink image to said article surface.

References Cited

UNITED STATES PATENTS

| 1,326,843 | 12/1919 | Brewer | 156—240UX |

FOREIGN PATENTS

| 714,454 | 11/1941 | Germany | 156—240 |
| 735,780 | 8/1955 | Great Britain | 156—241 |
| 1,139,132 | 11/1962 | Germany | 156—240 |

LELAND A. SEBASTIAN, Primary Examiner

U.S. Cl. X.R.

156—241, 247, 540; 264—132